(12) United States Patent
Butsuen et al.

(10) Patent No.: US 8,348,240 B2
(45) Date of Patent: Jan. 8, 2013

(54) DRIVING DEVICE

(75) Inventors: Tsukasa Butsuen, Hiroshima (JP); Kozo Odoi, Hiroshima (JP); Bernhard Alois Meier, Kirchheim (DE)

(73) Assignee: Webasto SE, Stockdorf (DE)

( * ) Notice: Subject to any disclaimer, the term of this patent is extended or adjusted under 35 U.S.C. 154(b) by 757 days.

(21) Appl. No.: 12/514,386

(22) PCT Filed: Nov. 16, 2007

(86) PCT No.: PCT/JP2007/072273
§ 371 (c)(1),
(2), (4) Date: Sep. 14, 2009

(87) PCT Pub. No.: WO2008/059955
PCT Pub. Date: May 22, 2008

(65) Prior Publication Data
US 2010/0006809 A1   Jan. 14, 2010

(30) Foreign Application Priority Data
Nov. 17, 2006   (JP) .................................. 2006-311341

(51) Int. Cl.
*B66D 1/14*   (2006.01)
(52) U.S. Cl. ............ 254/342; 49/354; 49/340; 296/223; 296/216.07; 296/216.08
(58) Field of Classification Search ................... 254/342; 74/25, 467; 296/223, 216.06–216.08, 54; 49/340, 346, 354
See application file for complete search history.

(56) References Cited

U.S. PATENT DOCUMENTS

| | | | |
|---|---|---|---|
| 4,468,063 A * | 8/1984 | Yukimoto et al. | 296/223 |
| 4,939,867 A * | 7/1990 | Harada et al. | 49/349 |
| 4,995,665 A * | 2/1991 | Ichinose et al. | 296/213 |
| 6,401,392 B1 * | 6/2002 | Yuge | 49/340 |
| 6,424,109 B2 * | 7/2002 | Ochiai et al. | 318/445 |
| 6,427,386 B1 | 8/2002 | Kalb et al. | |
| 6,431,644 B1 * | 8/2002 | Nagashima et al. | 296/223 |
| 2001/0013714 A1 * | 8/2001 | Ochiai et al. | 296/223 |

FOREIGN PATENT DOCUMENTS

| | | |
|---|---|---|
| DE | 198 47 016 | 4/2000 |
| DE | 696 04 428 | 5/2000 |
| EP | 0 469 286 | 2/1992 |
| JP | 2001-138747 A | 5/2001 |
| JP | 2001-513726 T | 9/2001 |
| JP | 2002-527693 T | 8/2002 |
| JP | 2006-168531 | 6/2006 |
| JP | 2006-168531 A | 6/2006 |

OTHER PUBLICATIONS

International Search Report dated Feb. 19, 2008.
Supplementary European Search Report dated Nov. 25, 2011.

* cited by examiner

*Primary Examiner* — Emmanuel M Marcelo
(74) *Attorney, Agent, or Firm* — Fitch, Even, Tabin & Flannery, LLP

(57) ABSTRACT

An output shaft to which the rotational force of a motor is transferred is housed in a case. One end side of the output shaft protrudes from a side surface of the case. A pinion gear is fixed to one end side of the output shaft. Teeth that mesh with the pinion gear are formed on the outer circumferential surface of cables. Cable guide surfaces for guiding the cables to mesh with the pinion gear are provided on the side surface of the case.

4 Claims, 4 Drawing Sheets

DRIVING DEVICE

CROSS-REFERENCE TO RELATED APPLICATIONS

This Application is a U.S. national phase application filed under 35 U.S.C. §371 of International Application No. PCT/JP2007/072273, filed Nov. 16, 2007, designating the United States, which claims priority from Japanese Patent Application No.: JP 2006-311341, filed Nov. 17, 2006, which are hereby incorporated herein by reference in their entirety for all purposes.

TECHNICAL FIELD

The present invention relates to a drive device that uses the rotational force of a motor to move a drive cable for driving an object to be driven in the direction of its axial center line.

BACKGROUND ART

As disclosed in, for example, cited reference 1, a conventionally known drive device of this type for which a roof panel constituting a part of a vehicle sunroof apparatus serves as the object to be driven is configured in such a way as to drive the roof panel by the push-pull operation of a drive cable. The drive device of cited reference 1 comprises a case in which a toothed mechanism for decelerating the rotational speed of a motor and an output shaft are housed. The case is mounted on a support plate constituting a part of the sunroof apparatus. One end side of the aforementioned output shaft protrudes from the case toward the support plate side. A pinion gear is fixed to one end side of the output shaft.

On the other hand, teeth that mesh with the pinion gear are formed in an outer circumferential surface of the cable of the drive device. The cable is configured separately to the support plate, and is held in an inserted state in a guide pipe mounted on the support plate. The cable inserted in the guide pipe is disposed in such a way that the teeth mesh with the pinion gear.

According to the aforementioned drive device, when the pinion gear is rotated as a result of the transmission of the rotational force of the motor to the output shaft by way of the toothed mechanism, the cable, while sliding within the guide pipe and being guided along a predetermined track, moves in the direction of its axial center line. The roof panel is driven by the movement of the cable.

Cited Reference 1: Japanese Patent Application No. 2006-168531

DISCLOSURE OF THE INVENTION

Problems to be Solved by the Invention

However, because a guide pipe for guiding the cable is provided in the drive device of cited reference 1, the cable is separately provided from the case a distance equivalent to the wall thickness of the guide pipe. In addition, the guide pipe is separately configured to the support plate, and is mounted in the support plate. Accordingly, in consideration of the manufacturing tolerance of both the guide pipe and the support plate, and the contact with the case caused by vibration when the vehicle is in motion, the guide pipe needs to be separately provided from the case and, therefore, the cable is separately provided from the case. With the cable separately disposed from the case in this way, the space for housing the drive device is, when considered in its entirety, magnified.

In addition, because the cable of the drive device of cited reference 1 is supported by way of the guide pipe by the support plate separately configured to the case, the manufacturing tolerance and assembly error generated in the support plate and the guide pipe render precise cable positioning difficult. Imprecise cable positioning increases the likelihood of improper meshing with the pinion gear and, in turn, unsmooth cable movement.

With the foregoing conditions in mind, it is an object of the present invention to provide a drive device configured in such a way as to move a cable in the direction of its axial center line which, while reducing the space required to house the drive device due to the compacted arrangement of the cable and case for housing the output shaft, affords precise positioning and smooth cable movement.

Means to Solve the Problems

In order to attain the aforementioned object, in the present invention a region of the cable on the case side is guided by a cable guide surface provided on one side surface of the case.

More specifically, a first invention of a drive device which comprises a drive cable coupled to an object to be driven and a motor, and which is configured so that the aforementioned cable is moved in the direction of its axial center line by a rotational force of the motor comprises: an output shaft to which a rotational force of the aforementioned motor is transferred; a case in which the aforementioned output shaft is housed in a state in which one end side of the output shaft protrudes therefrom; a drive-side meshing portion provided in one end side of the aforementioned output shaft; and a driven-side meshing portion provided along a predetermined length of the aforementioned cable, wherein the driven-side meshing portion of the aforementioned cable is disposed along one side surface of the aforementioned case in such a way as to mesh with the aforementioned drive-side meshing portion, and a cable guide surface of a shape for guiding an region of the driven-side meshing portion of the aforementioned cable on the case side is provided on one side surface of the aforementioned case.

According to this configuration, when the rotational force of the motor is transferred to the output shaft, the drive-side meshing portion is rotated around the output, shaft. The rotational force of the drive-side meshing portion is transferred to the driven-side meshing portion of the cable, and the cable is moved in the direction of its axial center line. At this time, the cable is guided by the cable guide surface provided in one side surface of the case and, therefore, the cable is disposed in close proximity to the case, and the cable and case are compactly arranged. In addition, because the cable guide surface is provided in the case, the cable is able to be comparatively more precisely positioned with respect to the case than is possible in the conventional example in which a guide pipe and a support plate separately disposed from the case are utilized to position the cable.

In a second invention of a drive device according to the first invention, a supporting member formed in such a way as to abut the driven-side meshing portion of the cable from a side opposing the cable guide surface is fixed to the case.

According to this configuration, the cable remains stable during movement.

In a third invention of a drive device according to the second invention, a pair of cables are disposed with an interval therebetween, and a fixing portion to which the supporting member is fixed is provided in a region of the case that corresponds to the interval between the pair of cables.

According to this configuration, the support member is fixed to the case between the pair of cables. Accordingly, while reducing the number of fixing portions, the holding member is able to be fixed in a state in which it is precisely positioned with respect to the two cables.

In a fourth invention of a drive device according to the second or third inventions, an abutting portion is provided on at least one of either the case or the supporting member to abut the other.

According to this configuration, when an abutting portion is provided on, for example, the case, the abutting member abuts the holding member and, as a result, the case is able to be positioned on the holding member. By virtue of this, the positional relationship between the cable guide surface and the holding member is able to be easily set to a regular state. Notably, the provision of an abutting portion on the holding member renders the same effect as the provision of an abutting portion on both the case and the holding member.

Effect of the Invention

According to the first invention, because a cable guide surface for guiding a region of the cable on the case side is provided on one side surface of the case in which the output shaft is housed, while reducing the housing space for the drive device due to the compacted arrangement of the cable and case, the cable is able to be precisely positioned with respect to the case and, in turn, the cable is able to move smoothly.

According to the second invention, because a holding member that abuts the cable from the opposite side to the cable guide surface is fixed to the cable, the cable is able to be smoothly guided.

According to the third invention, because fixing portions for fixing the holding member are provided in the part between the pair of cables of the case, while reducing the number of fixing portions and simplifying the structure, the two cables are able to be stably guided by the holding member.

According to the fourth invention, because an abutting portion is provided in at least one of either the case or the holding member to abut the other, the positional relationship between the cable guide is able to be easily set to a regular state and, in turn, the cable is able to move smoothly.

EXPLANATION OF SYMBOLS

Figure 1:
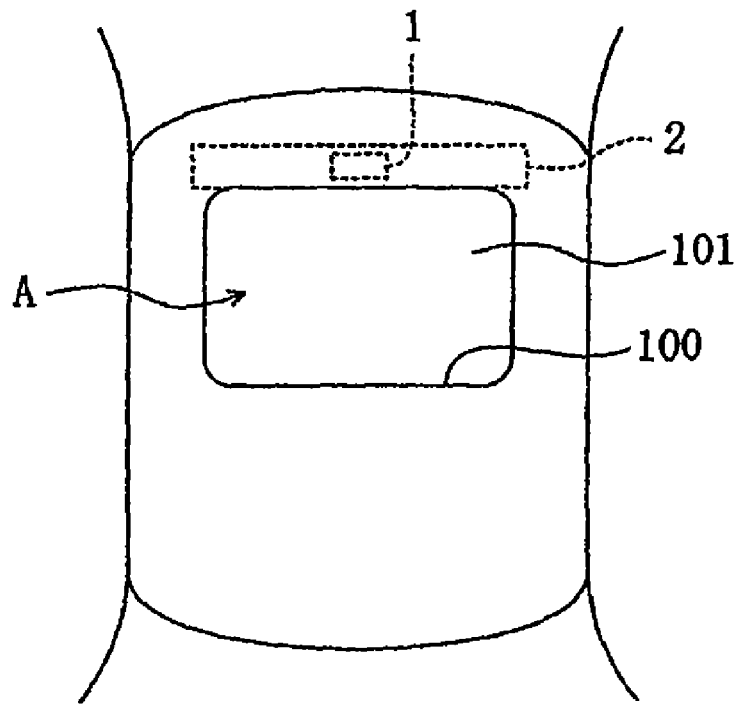
[FIG. 1] is a plan view of a vehicle roof in which a drive device of an embodiment of the present invention has been mounted.

1 Drive device
2 Front frame (Supporting member)
3 First cable
4 Second cable
3a, 4a Teeth (Driven-side meshing portion)
10 Motor
12 Output shaft
13 Pinion gear (Drive-side meshing portion)
14 Case
25 Plate member
30 First cable guide surface
31 Second cable guide surface
32 First fixing portion
33 Second fixing portion
34 Abutting portion
101 Roof panel (object to be driven)

BEST MODE FOR CARRYING OUT THE INVENTION

Embodiments of the present invention will be hereinafter described with reference to the drawings. The following description of the preferred embodiments is for illustrative purposes only, and is in no way intended to limit the present invention, or its applications or uses.

Embodiment 1 of the Invention

FIG. 1 shows a roof of a vehicle comprising a sunroof apparatus A, the sunroof apparatus A comprising a roof panel 101 for opening and closing an opening portion 100 formed in the roof, a pair of link members (not shown in the diagram) coupled to left and right end portions of the roof panel 101, a slide rail (not shown in the diagram) for guiding the left and right end portions of the roof panel 101 in the forward-back direction, a drive device 1 of the present invention for driving the roof panel 101, and a front frame 2 on which the drive device 1 is mounted.

The aforementioned front frame 2, which is constituted from a resin material, is formed to extend in the vehicle width direction and is mounted under, and in close proximity to, the vehicle front edge of the opening portion 100 of the roof. The aforementioned drive device 1 is mounted on the lower surface of the front frame 2. The underneath of the front frame 2 and the drive device 1 are covered by an inner lining material (not shown in the diagram).

Figure 2:
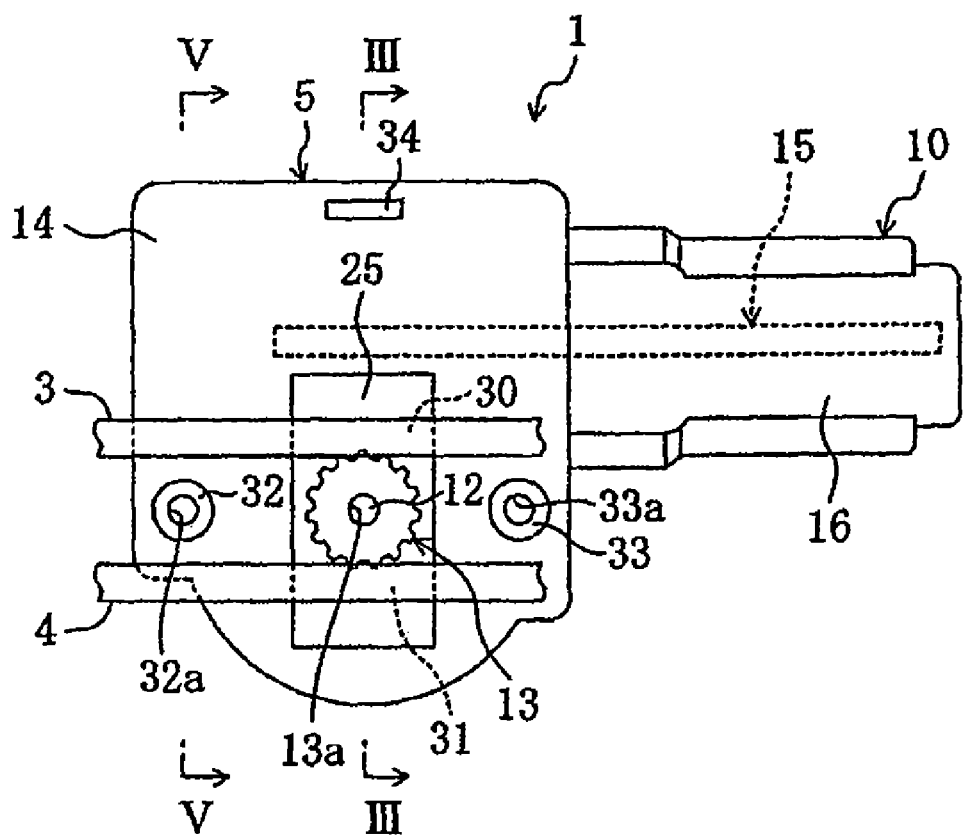
[FIG. 2] is a plan view of the drive device.

As shown in FIG. 2, the aforementioned drive device 1 comprises first and second cables 3, 4 serving as drive cables, and drive power generating portions 5 for moving these cables 3, 4 in the direction of their axial center lines. End portions of the first and second cables 3, 4 are fixed to the left-side link member and the right-side link member of the vehicle respectively, and are coupled to the roof panel 101 by way of the left-side and the right-side link members. The movement of the first and second cables 3, 4 produces the tilt and slide operations of the roof panel 101 while it traces a predetermined track.

Figure 3:
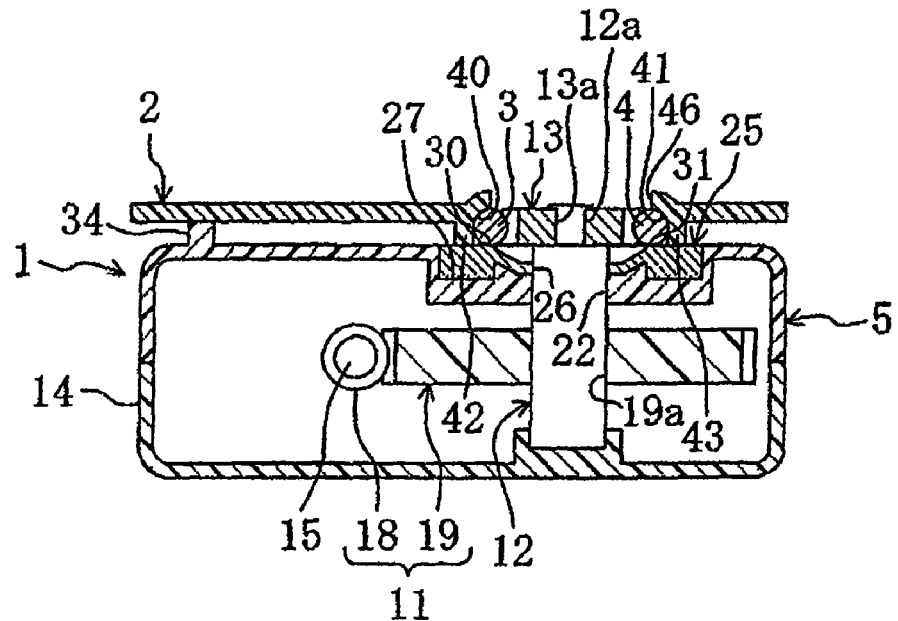
[FIG. 3] is a cross-sectional view along the line III-III of FIG. 2.

A drive force generating portion 5 of the aforementioned drive device 1 comprises a motor 10 and, as shown in FIG. 3, a gear mechanism 11 for decelerating the rotational speed of the motor 10, an output shaft 12 to which the output from the gear mechanism 11 is transferred, a pinion gear 13 fixed to the output shaft 12, and a case 14 for housing the gear mechanism 11 and the output shaft 12.

As shown in FIG. 2, the aforementioned motor 10 comprises a housing 16 that is long in the direction in which a rotary shaft 15 extends, the rotary shaft 15 protruding from one end portion of the housing 16 in the lengthwise direction. The housing 16 of the motor 10 is integrally fixed to one side in the width direction of the case 14 whereupon, in this state, the leading end side of the rotary shaft 15 is positioned within the case 14. As shown in FIG. 3, a worm 18 serving as a drive-side gear of the gear mechanism 11 is provided in the leading end side of the rotary shaft 15 in the direction in which it protrudes. While not shown in the diagram, a control circuit of the motor 10 is arranged within the aforementioned case 14, and the start-up, stoppage and forward/reverse rotation switchover of the motor 10 is performed by this control circuit. This control circuit may be arranged externally of the case 14.

The aforementioned case 14 is formed in a box shape from a resin material. A worm gear 19 is disposed in the case 14 in such a way as to mesh with the worm 18 of the aforementioned rotary shaft 15. The worm gear 19 constitutes the driven-side gear of the gear mechanism 11. A center hole 19a is penetratingly formed in a center portion of the worm gear 19. The output shaft 12 is inserted into the center hole 19a, and the worm gear 19 and output shaft 12 are integrated in such a way as to not rotate relative to each other. The gear mechanism 11 may be configured from a gear other than a worm.

The aforementioned output shaft 12 is rotatably supported on the case 14 and, accordingly, the worm gear 19 resides in a state in which it is supported on the case 14 by way of the output shaft 12. A through-hole 22 opens at one side (upper side of FIG. 3) surface of the case 14, and one end side of the output shaft 12, passing through the through-hole 22, protrudes outward from the case 14. The output shaft 12 comprises a small diameter portion 12a in one end side that is of a smaller diameter than the other end side. The small diameter portion 12a is inserted into a center hole 13a formed in the center portion of the aforementioned pinion gear 13, and the pinion gear 13 and the output shaft 12 are integrated in such a way as not to rotate relative to each other. The pinion gear 13 serves as the drive-side meshing portion of the present invention which constitutes a so-called helical gear in which, in the side view, the teeth lie diagonal to the center line of the pinion gear 13.

The aforementioned first and second cables 3, 4 constitute well-known toothed cables normally utilized by the sunroof apparatus A. Teeth 3a, 4a (shown in FIG. 4) of these cables 3, 4 are, excluding the two end portions, continuously formed along a predetermined length of a center portion thereof in the longitudinal direction. The teeth 3a, 4a are formed in a shape to mesh with the pinion gear 13. The length along which the teeth 3a, 4a are formed corresponds to the movement amount of the first and second cables 3, 4. The teeth 3a, 4a of the cables 3, 4 serve as the driven-side meshing portion of the present invention.

As is also shown in FIG. 3, the center portion in the longitudinal direction of the aforementioned first and second cables 3, 4 is disposed to sandwich the pinion gear 13 from both sides in the radial direction and to lie along one side surface of the case 14 and, furthermore, extends approximately parallel with the pinion gear 13 with an interval therebetween equivalent to the outer diameter thereof. In this state, the teeth of the pinion gear 13 mesh with the teeth 3a, 4a of the first and second cables 3, 4.

A plate member 25 constituting a part of the case 14 is provided on one side surface of the aforementioned case 14. The plate member 25, which is constituted from a metal material, is positioned in a location that corresponds to the through-hole 22 of the case 14, and comprises a through-hole 26 coincident with the through-hole 22. In other words, as also shown in FIG. 2, the plate member 25 describes a shape that surrounds the perimeter of the through-hole 22 of the case 14.

As shown in FIG. 3, the aforementioned plate member 25 mates with a mating recess 27 formed in one side surface of the case 14 and, as a result, is integrated with the main body portion of the case 14. In this state, the surface of the plate member 25 is exposed through the main body portion of the case 14.

First and second cable guide surfaces 30, 31 for guiding regions of the first and second cables 3, 4 of the case 14 side are formed in one side surface of the aforementioned case 14. The first and second cable guide surfaces 30, 31 are configured as flat surfaces approximately orthogonal to the center line of the pinion gear 13, and extend in the center line direction of the first and second cables 3, 4 arranged in the manner described above. As also shown in FIG. 2, the region of the first and second cable guide surfaces 30, 31 in close proximity of the pinion gear 13 is constituted from the upper surface of the aforementioned plate member 25. Notably, the shape of the first and second cable guide surfaces 30, 31 is not limited to the shape described above and may be altered to various shapes that correspond to the shape of the case 14, or to the track of the first and second cables 3, 4.

First and second fixing portions 32, 33 fixed to the front frame 2 are provided in the aforementioned case 14. These first and second fixing portions 32, 33 are positioned in a region corresponding to the region between the first and second cables 3, 4 of the case 14, that is to say, between the first cable guide surface 30 and the second cable guide surface 31. The aforementioned first and second fixing portions 32, 33 comprise fastening holes 32a, 33a respectively and, as shown in FIG. 5, a screw 35 is inserted into these fastening holes 32a, 33a.

In addition, an abutting portion 34 for abutting the front frame 2 is provided in one side surface of the aforementioned case 14. The abutting portion 34 describes a projecting shape arranged separately from the first and second fixing portions 32, 33 which, in a state in which it abuts the front frame 2, establishes and holds a predetermined interval between the one side surface of the case 14 and the front frame 2. Notably, the position and shape of the abutting portion 34 may be arbitrarily set and, in addition, two or more abutting portions 34 may be provided.

Figure 5:
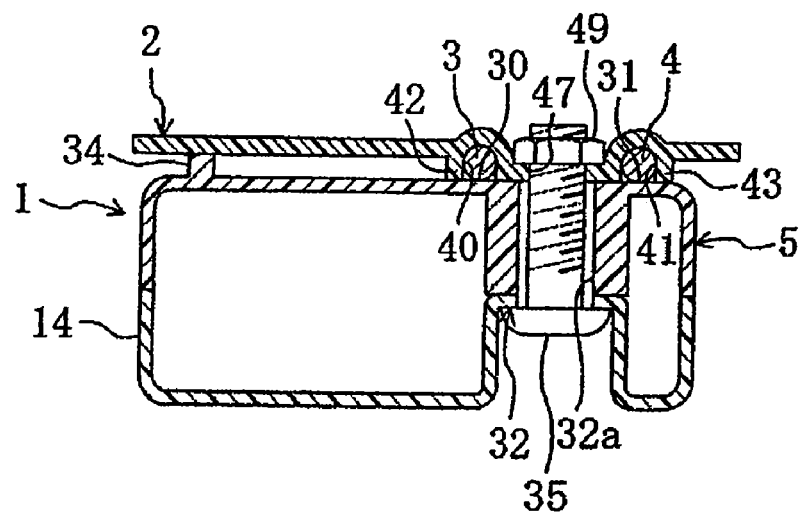
[FIG. 5] is a cross-sectional view along the line V-V of FIG. 2.
Figure 6:
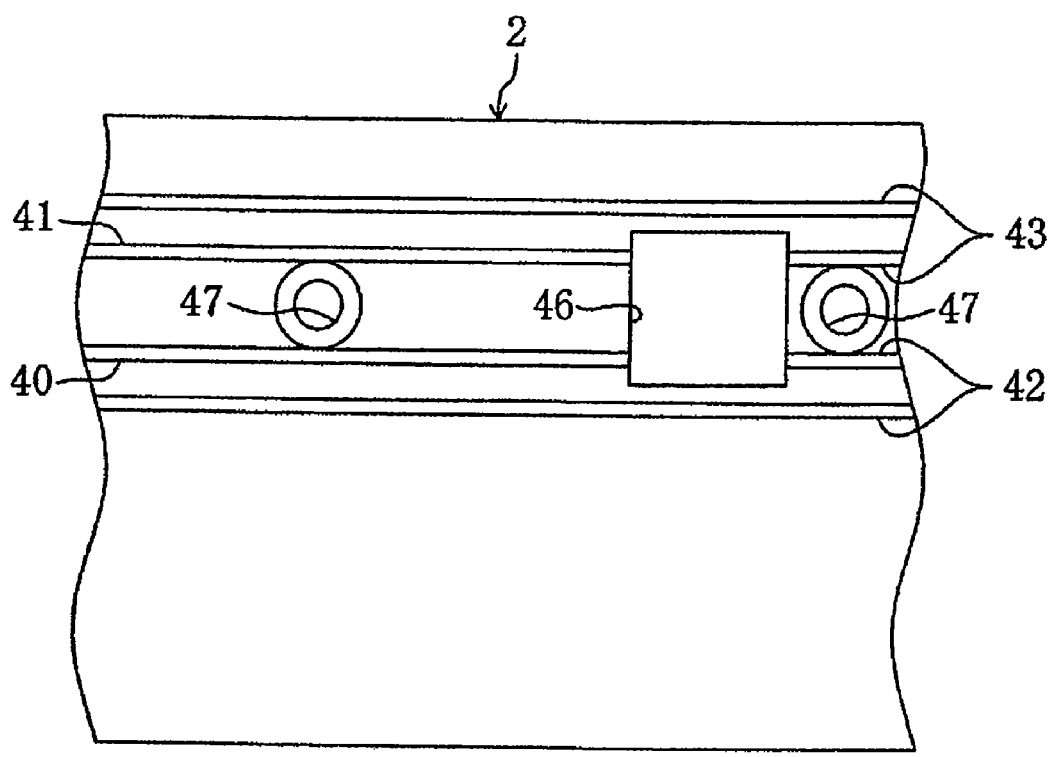
[FIG. 6] is a diagram of the front frame as viewed from the surface side in which the drive device is mounted.

As shown in FIG. 3 and FIG. 5, first and second recessed portions 40, 41 which extend correspondingly to the center portions of the first and second cables 3, 4 respectively are formed in the aforementioned front frame 2. The first recessed portion 40 is shaped to abut the center portion of the first cable 3 from the side opposing the first cable guide surface 30. As shown in FIG. 3 and FIG. 6, a pair of first raised portions 42, 42 protruding toward the case 14 side are formed in the two edge portions in the width direction of the first recessed portion 40. The second recessed portion 41, similarly to the first recessed portion 40, is shaped to abut the second cable 4 from the side opposing the second cable guide surface 31, and a pair of second raised portions 43, 43 are formed in the two edge portions in the width direction of the second recessed portion 41.

Figure 4:
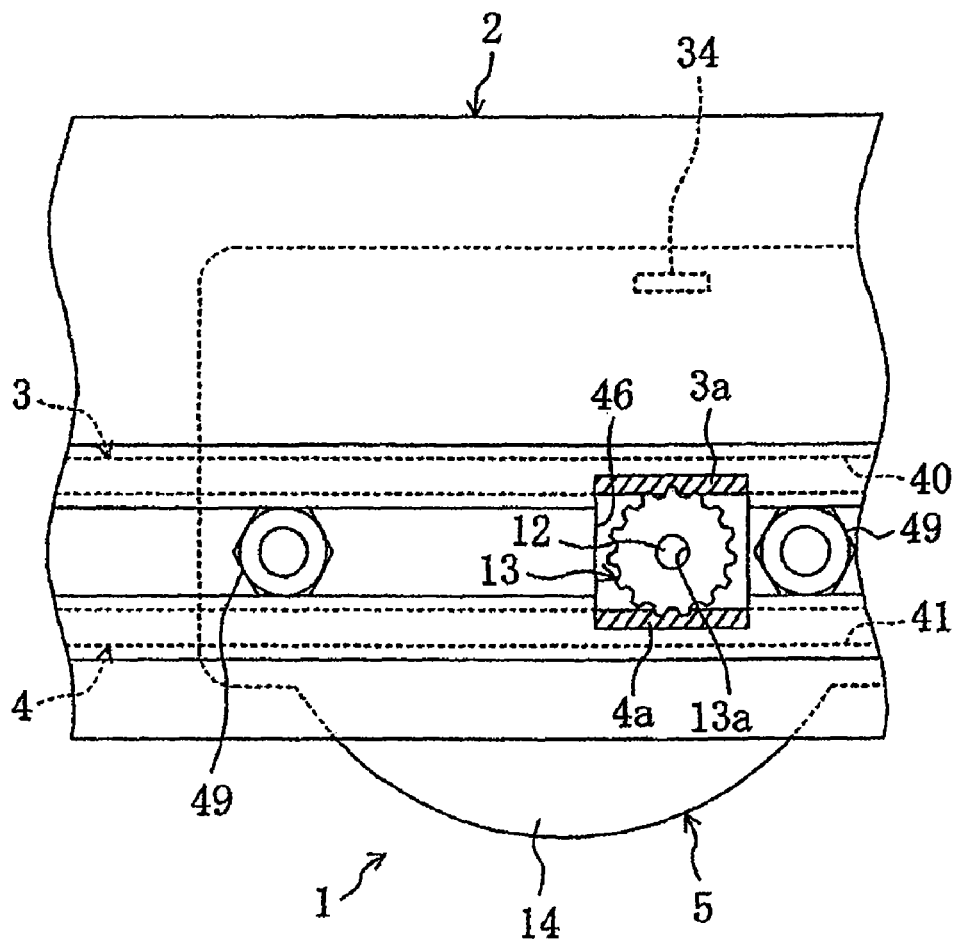
[FIG. 4] is a plan view showing a section of a front frame in which the drive device has been mounted.

An opening portion 46 is formed in a region of the aforementioned front frame 2 corresponding to the pinion gear 13 in such a way as to expose the pinion gear 13. In addition, two fastening holes 47 corresponding to the first and second fixing portions 32, 33 of the case 14 are formed in the front frame 2. The fastening holes 47, 47 are positioned between the first recessed portion 40 and the second recessed portion 41. As shown in FIG. 4 and FIG. 5, nuts 49, 49 are arranged on the surface of the front frame 2 matching the fastening holes 47, 47 on the side opposing the surface on which the case 14 is mounted.

When the aforementioned case 14 is mounted on the front frame 2, the first and second cables 3, 4 are initially inserted into the first and second recessed portions 40, 41 of the front frame 2. In addition, the fastening holes 32a, 33a of the case 14 and the fastening holes 47, 47 of the front frame 2 are matched, and the abutting portion 34 is abutted against the front frame 2. Following this, screws 35 are inserted into the fastening holes 32a, 33a, 47, 47 from the case 14 side, and nuts 49 are fastened thereon.

As shown in FIG. 3 and FIG. 5, in a state in which the aforementioned case 14 is mounted on the front frame 2, the first cable guide surface 30 abuts a region of the first cable 3 on the case 14 side, the inner circumferential surface of the first recessed portion 40 abuts the side of the first cable 3 opposing the case 14 and, furthermore, the pair of first raised portions 42, 42 also abut the first cable 3. In this way, the positioned state of the first cable 3 is held by the case 14 and the front frame 2. The positioned state of the second cable 4 is similarly held. At this time, because the region between the first and second recessed portions 40, 41 is fastened and fixed to the case 14 between the first and second cables 3, 4, the first and second recessed portions 40, 41 are able to be fixed in a precisely positioned state with respect to the two cables 3, 4 without need to increase the number of first and second fixing portions 32, 33. The aforementioned front frame 2 serves as the holding member of the present invention.

In addition, because the first and second cables 3, 4 are abuttingly positioned against the first and second cable guide surfaces 30, 31 provided on one side surface of the case 14 as described above, the cables 3, 4 are disposed in close proximity to the case 14. In addition, because the first and second cable guide surfaces 30, 31 are formed in the case 14, the first and second cables 3, 4 and case 14 are able to be positioned in closer proximity, and the two cables 3, 4 are able to be positioned more precisely with respect to the case 14 than in a conventional example when a guide pipe or a support plate separately arranged from the case 14 are utilized to position the cable.

The operation of the drive device 1 of the configuration described above will be hereinafter described. When a voltage is applied to the motor 10 to rotate the rotary shaft 15, the worm 18 rotates and a rotational force therefrom is transferred to the worm gear 19. The output shaft 12 is rotated by the rotation of the worm gear 19 and, in turn, the pinion gear 13 is rotated. When the pinion gear 13 is rotated, the teeth 3a, 4a of the first and second cables 3, 4 mesh with the pinion gear 13 and, as a result, the two cables 3, 4 move synchronously in the direction of their axial center lines. At this time, the first and second cables 3, 4 are guided by the first and second cable guide surfaces 30, 31 of the case 14, the first and second recessed portions 40, 41, and the first and second raised portions 42, 43 of the front frame 2. The movement direction of the first cable 3 is the reverse direction of the movement direction of the second cable 4.

As is described above, according to the drive device 1 of this embodiment, because the first and second cable guide surfaces 30, 31 are provided on one side surface of the case 14, the space for housing the drive device 1 is able to be reduced due to the compacted arrangement of the first and second cables 3, 4 and case 14 and, at the same time, the first and second cables 3, 4 are able to be precisely positioned with respect to the case 14, and the two cables 3, 4 are able to be smoothly moved. The reduction of the space for housing the aforementioned drive device 1 increases the interior passenger space of the vehicle in the top-down direction.

In addition, the first and second cables 3, 4 are guided from both sides by the first and second cable guide surfaces 30, 31 and the first recessed portion 40 and the second recessed portion 41 of the front frame 2 in the radial direction of the first and second cables 3, 4 and, in addition, by the pair of first and second raised portions 42, 43. As a result, the first and second cables 3, 4 are able to be stably moved, and improper meshing with the pinion gear 13 is able to be prevented.

In addition, because the region of the first and second cable guide surfaces 30, 31 in close proximity of the pinion gear 13 is constituted from the plate member 25 which is made of metal, wear of the case 14 caused by the movement of the first and second cables 3, 4 is able to be suppressed.

In addition, because an abutting portion 34 is provided in the case 14, the case 14 is able to be positioned in the front frame 2 as a result of the abutting portion 34 abutting against the front frame 2. Accordingly, the positional relationship between the first and second cable guide surfaces 30, 31 and the front frame 2 is able to be set easily in a regular state and, in turn, the cable is able to be smoothly moved.

Embodiment 2 of the Invention

Figure 7:
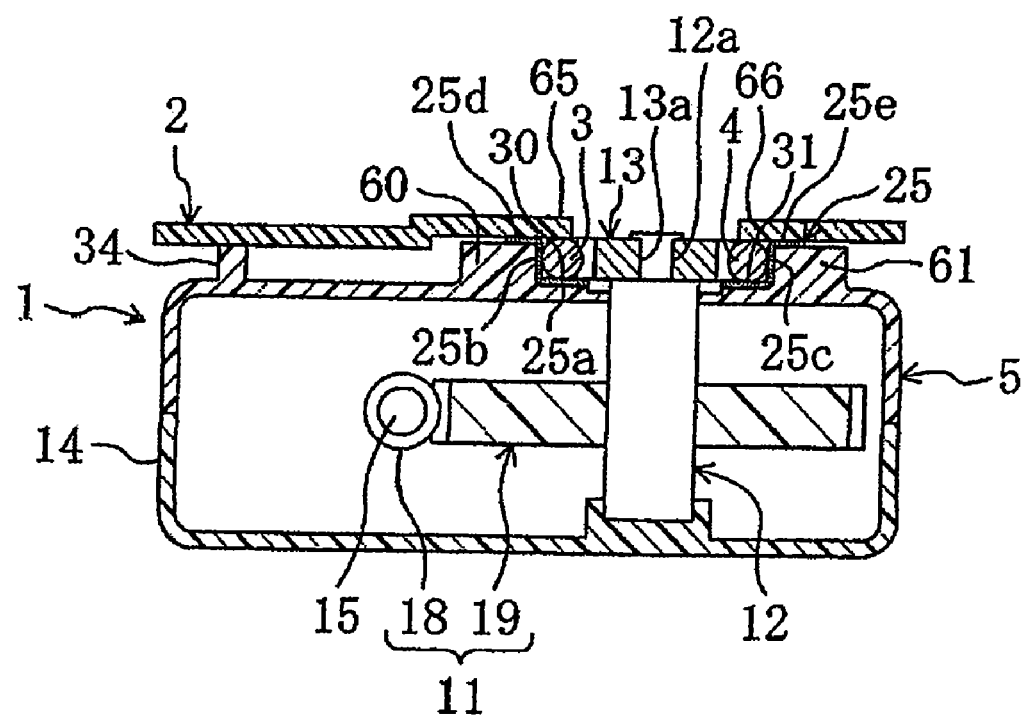
[FIG. 7] is a diagram of a second embodiment equivalent to FIG. 3.

FIG. 7 shows a drive device 1 of an embodiment 2 of the present invention in which, because the structure of this drive device 1 differs from the structure of embodiment 1 only in that the first and second cables 3, 4 are positioned in the case 14 and all other component parts are identical, identical symbols have been assigned to the component parts common to embodiment 1, and a description thereof has been omitted.

First and second protruding portions 60, 61 are separately formed in a region on one side surface of the case 14 of the drive device 1 from the outer circumferential surface of the pinion gear 13. The first and second protruding portions 60, 61 are disposed in such a way as to sandwich the pinion gear 13 in the radial direction, and are separately set an equivalent distance from the pinion gear 13.

The plate member 25 arranged in one side surface of the case 14 comprises a base plate portion 25a that extends along the one side surface of the case 14, first and second auxiliary plate portions 25b, 25c that extend from the base plate portion 25a along the side surface of the first and second protruding portions 60, 61, and leading-edge plate portions 25d, 25e that extend from the first and second auxiliary plate portions 25b, 25c along the leading edge surface of the first and second protruding portions 60, 61 in the direction of protrusion. A first cable 3 is disposed between the first auxiliary plate portion 25b and the pinion gear 13, and a second cable 4 is disposed between the second auxiliary plate portion 25c and the pinion gear 13. In addition, the region of the first and second cable guide surfaces 30, 31 in close proximity of the pinion gear 13 is constituted from the base plate portion 25a.

On the other hand, first and second guide portions 65, 66 formed to abut the first and second cables 3, 4 from the side opposing the case 14 are provided in the front frame 2.

In a state in which the aforementioned case 14 is mounted on the front frame 2, the first cable guide surface 30 abuts the region of the first cable 3 on the case 14 side, the first guide portion 65 abuts the side of the first cable 3 opposing the case 14 and, furthermore, the first auxiliary plate portion 25b abuts the first cable 3. In this way, the positioned state of the first cable 3 is held by the case 14 and front frame 2. The positioned state of the second cable 4 is held in a similar manner.

Accordingly, according to the drive device 1 of this embodiment, similarly to embodiment 1, because the first and second cable guide surfaces 30, 31 are provided on one side surface of the case 14, the space for housing the drive device 1 is able to be reduced due to the compacted arrangement of the first and second cables 3, 4 and case 14 and, at the same time, the first and second cables 3, 4 are able to be precisely positioned with respect to the case 14, and the two cables 3, 4 are able to be smoothly moved.

In addition, because the first and second auxiliary plate portions 25b, 25c of the plate member 25 are formed along the first and second protruding portions 60, 61 of the case 14, deformation of the first and second auxiliary plate portions 25b, 25c in a direction away from the pinion gear 13 is suppressed. As a result, the positioning precision of the first and second cables 3, 4 is able to be increased.

While each of the embodiments 1, 2 described above describes the provision of a drive device 1 comprising two cables 3, 4, this is not limited thereto, and a single cable may be used.

In addition, while each of the embodiments described above describes an abutting portion 34 provided in the drive device 1, this is not limited thereto, and this may be provided in the front frame 2, or it may be provided in both the drive device 1 and the front frame 2.

In addition, while the embodiments described above describe the drive device 1 as being mounted in the lower side of the front frame 2, this is not limited thereto, and the drive device 1 may be mounted on the upper side of the front frame 2. In addition, the positional arrangement of the drive device 1 may be arbitrarily altered according to the shape of the front frame 2 and the vehicle body side structure.

In addition, while the embodiments described above describe the application of the present invention in a sunroof apparatus A, the present invention may have application in devices other than the sunroof apparatus A that drive an object to be driven by a push-pull operation of the cables 3, 4, examples of which include automobile windows, sliding doors, and roofs and so on configured to open and close.

Industrial Applicability

As is described above, the present invention is suitable for application as, for example, drive devices for driving the roof panel of a vehicle sunroof apparatus.

The invention claimed is:

1. A drive device comprising a drive cable coupled to an object to be driven and a motor, and which is configured so that said cable is moved in the direction of its axial center line by a rotational force of the motor, comprising:
   a gear mechanism for decelerating the rotational speed of the motor;
   an output shaft to which an output of the gear mechanism is transferred;
   a case in which said gear mechanism and output shaft are housed, wherein the output shaft is rotatably supported on the case and is housed in the case in a state in which one end side of the output shaft protrudes therefrom;
   a drive-side meshing portion provided in the end of said output shaft protruding from said case;
   a drive-side meshing portion provided along a predetermined length of said cable, wherein the driven-side meshing portion of said cable is disposed along one side surface of said case in such a way as to mesh with said drive-side meshing portion, and
   a cable guide surface of a shape for guiding a region of the driven-side meshing portion of said cable on said side surface of said case is provided in said side surface of said case.

2. The drive device of claim 1, further comprising:
   a supporting member affixed to the case and formed in such a way as to abut the driven-side meshing portion of the cable from a side opposing the cable guide surface.

3. The drive device of claim 2, further comprising:
   a pair of cables are disposed with an interval therebetween; and
   a fixing portion to which the supporting member is fixed is provided in a region of the case that corresponds to the interval between the pair of cables.

4. The drive device of claim 2, further comprising:
   an abutting portion is provided on at least one of either the case or the supporting member to abut the other.

\* \* \* \* \*